(12) United States Patent
Jungwirth

(10) Patent No.: US 10,070,080 B2
(45) Date of Patent: Sep. 4, 2018

(54) MULTI-DIRECTIONAL, MULTI-SPECTRAL STAR TRACKER WITH A COMMON APERTURE AND COMMON CAMERA

(71) Applicant: The Boeing Company, Chicago, IL (US)

(72) Inventor: Douglas R. Jungwirth, Porter Ranch, CA (US)

(73) Assignee: The Boeing Company, Chicago, IL (US)

(*) Notice: Subject to any disclaimer, the term of this patent is extended or adjusted under 35 U.S.C. 154(b) by 397 days.

(21) Appl. No.: 14/714,633

(22) Filed: May 18, 2015

(65) Prior Publication Data

US 2016/0344955 A1  Nov. 24, 2016

(51) Int. Cl.
*G06T 7/246* (2017.01)
*H04N 5/357* (2011.01)
*H04N 5/225* (2006.01)
*G01S 3/786* (2006.01)

(52) U.S. Cl.
CPC ......... *H04N 5/3572* (2013.01); *G01S 3/7867* (2013.01); *G06T 7/246* (2017.01); *H04N 5/2254* (2013.01); *G06T 2207/10016* (2013.01); *G06T 2207/10036* (2013.01)

(58) Field of Classification Search
CPC ............... H04N 5/3572; H04N 5/2254; H04N 5/23229; H04N 5/217; G01S 3/7867; G06T 7/0042; G06T 2207/10036
USPC .......................................................... 348/169
See application file for complete search history.

(56) References Cited

U.S. PATENT DOCUMENTS

| 4,523,226 A * | 6/1985 | Lipton | H04N 13/0436 348/42 |
| 4,740,836 A * | 4/1988 | Craig | H04N 13/0436 348/157 |
| 4,950,056 A * | 8/1990 | Smith | G02B 17/0808 359/211.2 |
| 5,012,081 A | 4/1991 | Jungwirth et al. | |
| 5,161,051 A * | 11/1992 | Whitney | G02B 13/146 244/3.16 |
| 5,206,499 A * | 4/1993 | Mantravadi | G01S 3/7867 250/203.6 |
| 5,481,321 A * | 1/1996 | Lipton | G03B 35/22 348/E13.038 |
| 5,485,306 A * | 1/1996 | Kiunke | G02B 23/08 359/399 |

(Continued)

FOREIGN PATENT DOCUMENTS

WO  WO 2013104075 A1 *  7/2013

OTHER PUBLICATIONS

Andersen, Geoff, "the Telescope", Princeton University Press, p. 103, 2007.*

*Primary Examiner* — David Harvey
(74) *Attorney, Agent, or Firm* — Walters & Wasylyna LLC

(57) ABSTRACT

An optical star tracker system including a single common aperture, a single light-redirecting element, a single imaging sensor and an image processor, wherein the light-redirecting element receives incident light rays from a plurality of objects and forms images of the objects distorted at angles indicative of the multiple directions of the incident light rays from the objects depending on an orientation at which the incident light rays originated from the objects.

20 Claims, 11 Drawing Sheets

(56) References Cited

U.S. PATENT DOCUMENTS

| | | | | |
|---|---|---|---|---|
| 5,835,133 | A | * | 11/1998 | Moreton ............ G02B 27/2264 348/49 |
| 6,630,952 | B1 | * | 10/2003 | Beale .................. G08B 13/193 348/143 |
| 7,368,745 | B2 | * | 5/2008 | Kouris .................. B64G 1/361 250/550 |
| 7,804,517 | B2 | * | 9/2010 | Iwasaki ............. H04N 13/0217 348/46 |
| 2006/0085129 | A1 | * | 4/2006 | Belenkii ............. G01C 21/025 701/500 |
| 2009/0073254 | A1 | * | 3/2009 | Li ......................... G03B 17/00 348/36 |
| 2010/0283842 | A1 | * | 11/2010 | Guissin ................ G02B 13/06 348/68 |
| 2010/0314534 | A1 | * | 12/2010 | Campion ............... G01D 15/00 250/252.1 |
| 2014/0132804 | A1 | * | 5/2014 | Guissin ................ G02B 13/06 348/239 |
| 2015/0069239 | A1 | * | 3/2015 | Kester ....................... G01J 3/36 250/332 |
| 2016/0125638 | A1 | * | 5/2016 | Grimaud ................ G06T 15/04 348/169 |
| 2017/0026570 | A1 | * | 1/2017 | Shepard ................. G03B 37/00 |
| 2017/0214861 | A1 | * | 7/2017 | Rachlin .................. H04N 5/265 |

\* cited by examiner

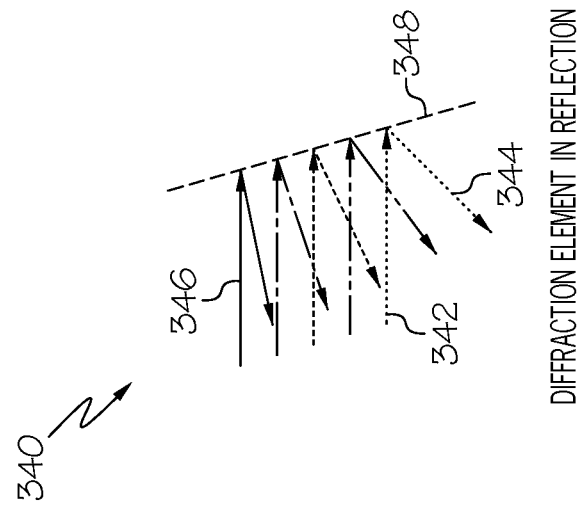
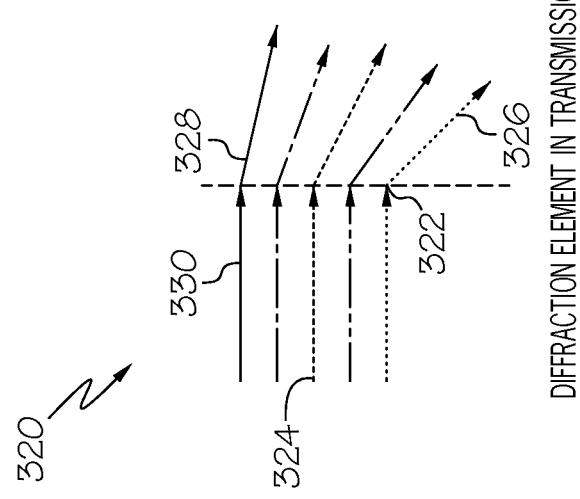
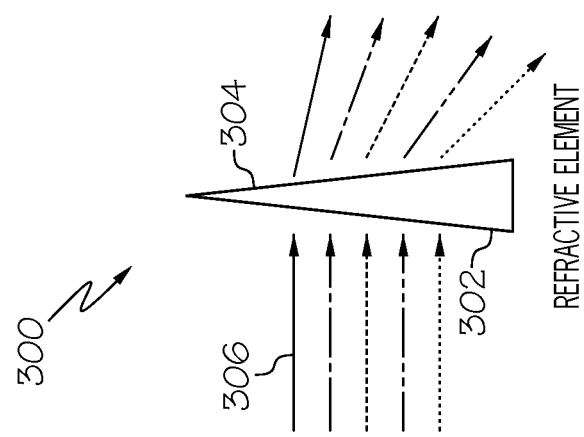

MULTI-DIRECTIONAL, MULTI-SPECTRAL STAR TRACKER WITH A COMMON APERTURE AND COMMON CAMERA

FIELD

This application relates to space navigation systems in general and, more particularly, to star trackers for guidance and navigation.

BACKGROUND

Space navigation systems use star trackers for guidance and navigation. Presently, large star tracker systems are used that have limited fields of view and use of one or more telescopes to aid in the navigation of the vehicle in question. These star trackers include telescope systems to locate and identify known stars to aid in the determination of pitch, roll and yaw of the vehicle. Star trackers may perform the navigation process in both day and night operation. The time histories of these pitch, roll and yaw measurements is used to correct and update the Inertial Navigation System (INS) in these vehicles.

In some cases, the vehicle can use one telescope on a multi axis gimbal to steer the telescope to a known direction and monitor the position of a bright star. In other cases, the vehicle depends on one rigidly mounted telescope to occasionally view a bright or known star and get the location with that random measurement. This is typically used on smaller vehicles that cannot devote a lot of surface area or volume for multiple telescopes pointed in orthogonal directions.

However, single axis measurements and limited field of view makes these measurements difficult. For this reason, systems were developed that can potentially use multiple views through a single aperture. These are referred to as "shared aperture systems." Shared aperture systems typically use multiple optical element systems and multiple camera detectors. These systems also use off axis optical systems. Accordingly, shared aperture systems are more expensive, are more complicated, provide less precise optical performance and use more internal volume.

Accordingly, those skilled in the art continue with research and development efforts in the field of light source tracking devices that may view many fields of view simultaneously so that the fields of view may be identified and so that the individual fields of view may be distinguished and processed separately to provide navigation information.

SUMMARY

In one embodiment, the disclosed light source tracking apparatus may include a single camera, including a single common aperture arranged to receive a plurality of incident light rays from a plurality of objects from multiple directions, a single light-redirecting element, for receiving the incident light rays from the plurality of objects and for providing transmitted light rays including transmitted light rays from a particular object of the plurality of objects to form images of the plurality of objects, the images of the plurality of objects being distorted at angles indicative of the multiple directions of the incident light rays from the plurality of objects depending on an orientation at which the incident light rays originated from the plurality of objects, a single imaging sensor arranged to capture the images of the plurality of objects from the multiple directions of the transmitted light rays from the light-redirecting element and an image processor arranged to receive the images of the plurality of objects and to separate from the images of the plurality of objects an image for a particular object based on distortion of transmitted light rays associated with the particular object to generate as an output the image of the particular object.

In another embodiment, the disclosed method for tracking a light source includes receiving input through a single common aperture of light from a plurality of objects in multiple directions, distorting, via a single light-redirecting element, the light received from the plurality of objects to output light from a particular object having an image distorted at a particular angle that is indicative of the direction of the light from the particular source, capturing, via a single imaging sensor, images for the plurality of objects in multiple directions from the output from the light-redirecting element, wherein the light image from a particular object is distorted at a particular angle depending on the orientation at which the light originated and processing via an image processor the single captured image to separate the light image for the particular object based on image distortion at the particular angle associated with the particular object, and generate an output of a specific light image associated with the particular object.

In yet another embodiment, the disclosed multi-spectral star tracker system includes a single camera with a single aperture and a lens set, and a line of sight optical system, the line of sight optical system arranged for viewing the plurality of objects in different directions simultaneously and generating multiple ghost images of the plurality of objects with a diffraction axis and an image of the plurality of objects with no diffraction axis, an imaging sensor arranged to capture the images of the plurality of objects with a diffraction axis and an image of the plurality of objects with no diffraction axis and to assign a particular optical axis to the plurality of objects with the diffraction axis, depending on axial orientation of the multiple ghost images of the plurality of objects with the diffraction axis and an image processor arranged to process the images of the plurality of objects captured by the imaging sensor to identify the plurality of objects with the diffraction axis and their associated axial orientation and the plurality of objects with no diffraction axis, the plurality of objects with no diffraction axis being identified by the image processor as the primary axis of the single camera, the image processor providing space navigation information using the primary access.

Other embodiments of the light source tracking apparatus, multi-spectral star tracker system and method will become apparent from the following detailed description, the accompanying drawings and the appended claims.

BRIEF DESCRIPTION OF THE DRAWINGS

FIGS. 3a-c illustrate optical elements that may be used as a light-redirecting element to produce a diffraction pattern from an object in the image according to an embodiment;

DETAILED DESCRIPTION

Figure 1:
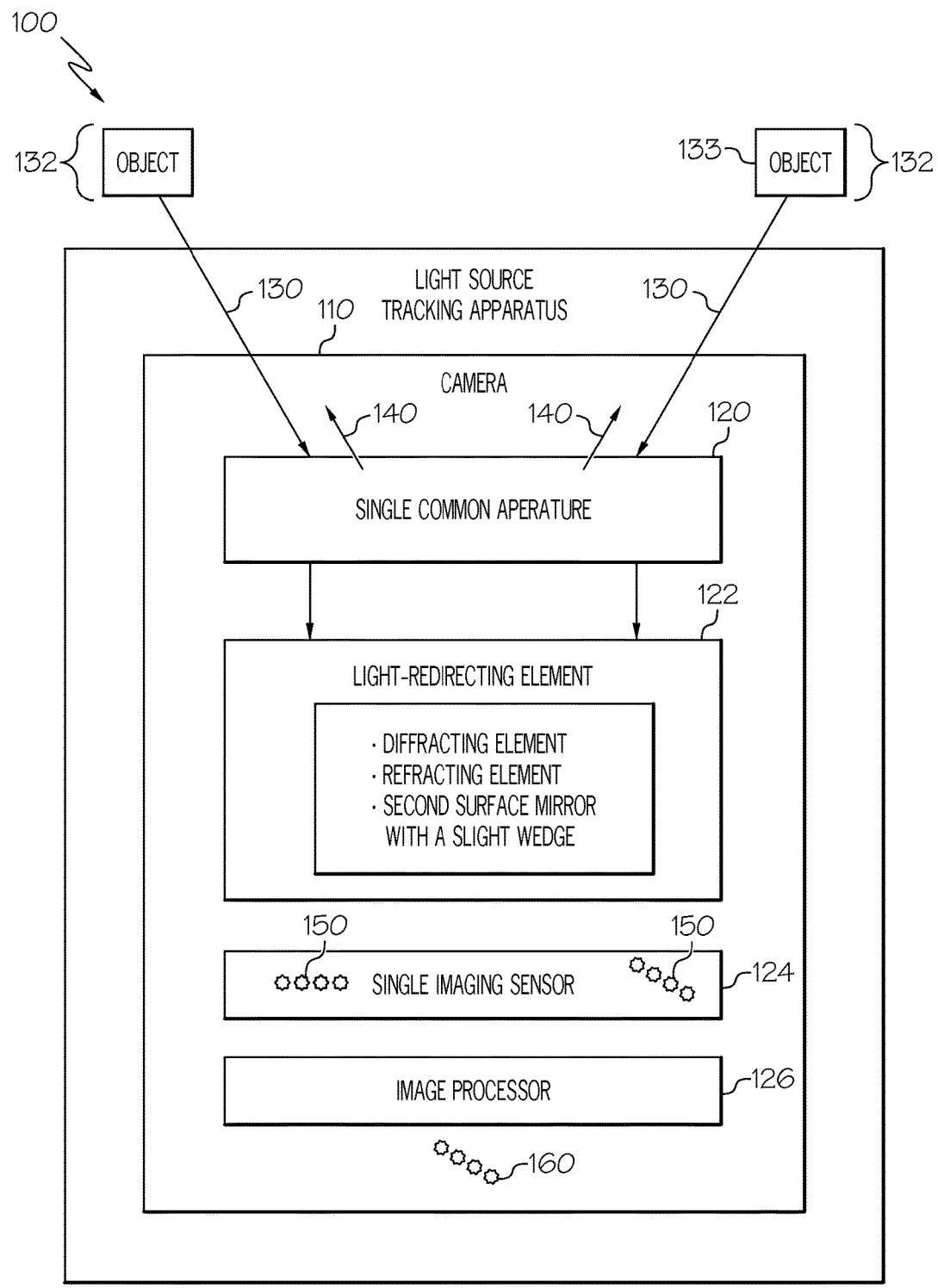
FIG. 1 illustrates a light source tracking apparatus according to an embodiment.

FIG. 1 illustrates a light source tracking apparatus 100 according to an embodiment. In FIG. 1, the light source tracking apparatus 100 includes a camera 110 having a single common aperture 120, a single light-redirecting element 122, a single imaging sensor 124 and an image processor 126. The common aperture 120 receives incident light rays 130 from a plurality of objects 132 from multiple directions 140. The light-redirecting element 122 bends different wavelengths of the light rays 130 in different directions to spread images 150 from the light rays 130 in spatial locations aligned along separate axes. The imaging sensor 124 captures the images 150 for the plurality of objects 132 from the output from the light-redirecting element 122. The image processor 126 provides an image 160 for a particular object 133 from the plurality of objects 132 as an output, e.g., the image 160 of the particular object 133.

As shown in FIG. 1, different approaches may be used to produce multiple or elongated images of an object, e.g., a star. In a beam path, one optical element for the light-redirecting element 122 is introduced to produce a diffraction pattern from an object in the image. For example, the light-redirecting element 122 may include a diffracting element, a refracting element and/or a second surface mirror with a slight wedge. The light-redirecting elements 122 may bend different wavelengths of light in a slightly different direction depending on the wavelength of the light rays 130 from the object. Properly processing the spread out images 150 will produce the spectral distribution of individual objects. Properly processing the spread out images 150 will also produce the theoretical centroid of that object. Mapping the image of objects 132 spread out in one specific direction results in a pattern of the objects in that one specific (off axis) orientation being identified.

Figure 2:
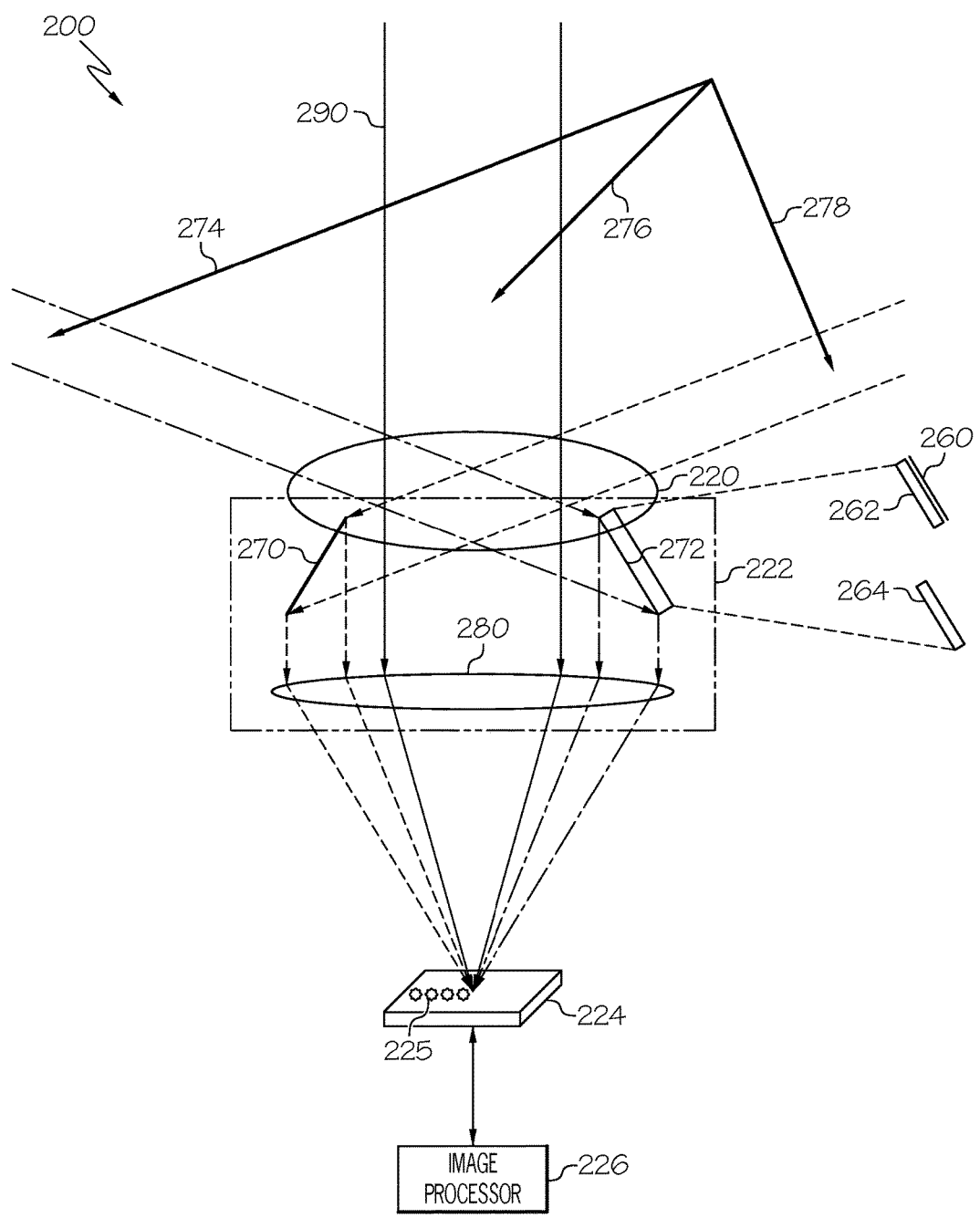
FIG. 2 illustrates a refracting light source tracking apparatus according to an embodiment.

FIG. 2 illustrates a refracting light source tracking apparatus 200 according to an embodiment. In FIG. 2, the refracting light source tracking apparatus 200 includes a single common aperture 220, a single light-redirecting element 222, a single imaging sensor 224 and an image processor 226. The common aperture 220 provides multiple view angles to allow the image processor 226 to calculate three coordinate angles simultaneously with an image from a single imaging sensor 224. In FIG. 2, one optical element is a reflection/re-direction element 270. A second optical element may be a re-direction/spreading element 272. The reflection/re-direction element 270 and the re-direction/spreading element 272 redirect several different beams along the same optical axis 290. Each of the several beams hits the lens system and is focused onto the image detector 224.

Figure 9:
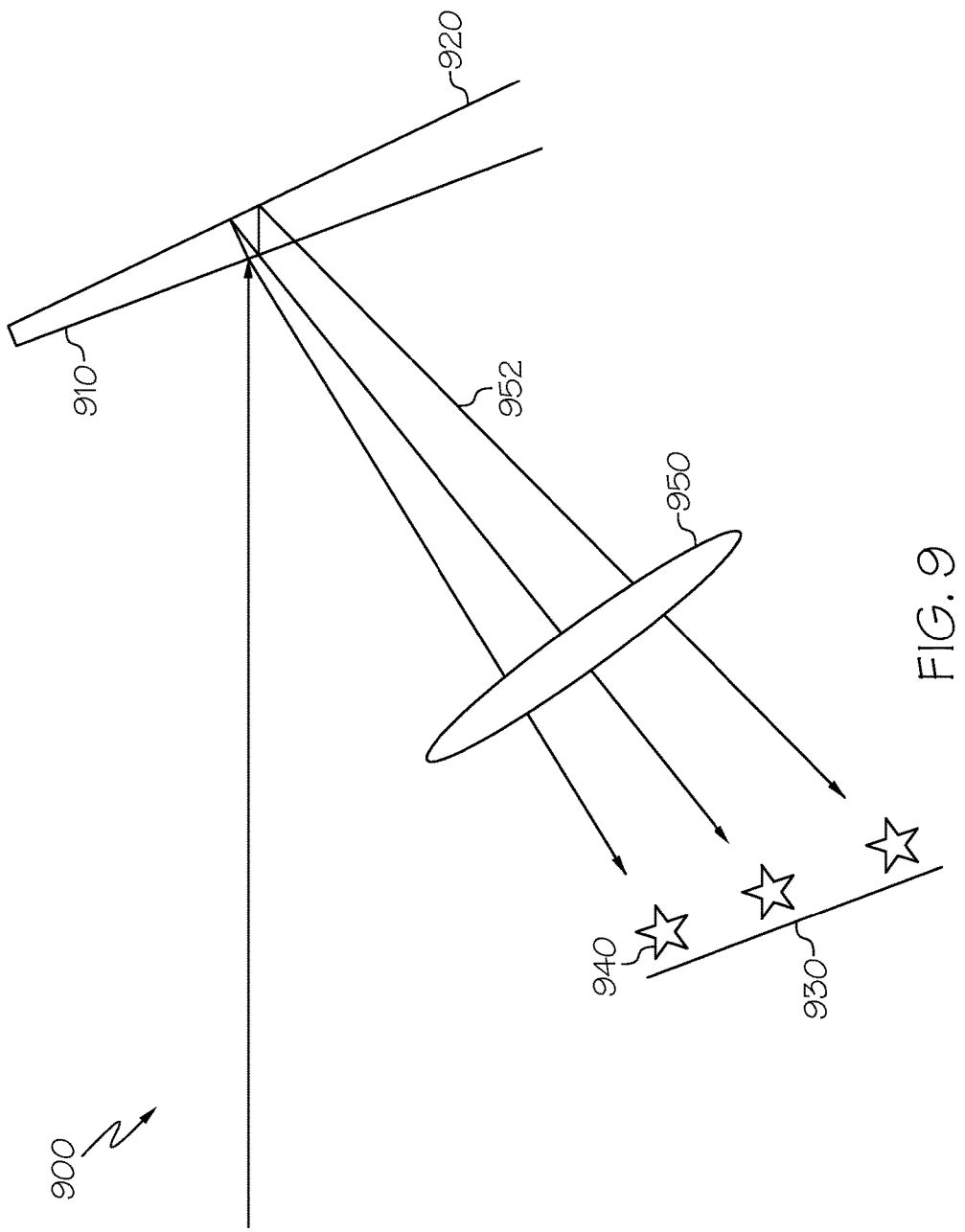
FIG. 9 illustrates a tracking apparatus having a wedged reflective mirror according to an embodiment.

Re-direction/spreading by re-direction/spreading element 272 may be performed separately or in combination with another optical element that spreads the beam out in one unique direction. For example, re-direction/spreading element 272 may involve combining the re-direction function with the beam spreading function in one optical element 264. For example, the re-direction/spreading element 272 may be a reflecting diffraction grating as shown in FIG. 3c or a wedge element with a reflecting surface as shown in FIG. 9.

A second example of the re-direction/spreading element 272 may involve a reflector such as a mirror 260 that reflects the light along the optical axis 290 with a separate refracting/diffracting element 262 to spread the beam out in the unique directions as required. The separate refracting/diffracting element 262 may be a simple wedge (refractive element) as shown in FIG. 3a or a diffraction gradient (in transmission) as shown in FIG. 3b. The re-direction/spreading element 272 may be used in all but one of the separate beam paths that are combined.

The reflection/re-direction element 270 and the re-direction/spreading element 272, in the off axis optical path/angle 274, 276, 278, disperses the star images to create a displaced or spectral pattern for an image of the stars in that line of sight. The star images may be dispersed, for example, to a lens set. The angle of the dispersion may be different for the optical paths for the beams/light rays. A lens 280 may be used to focus the images at the imaging sensor 224. Multiple view angles 274, 276, 278 allow the image processor 226 to calculate three coordinate angles 274, 276, 278 simultaneously with a single sensor image 225. Light rays from objects that are received along the primary axis 290 will not create images along a diffraction axis (see FIG. 8).

FIGS. 3a-c illustrate optical elements that may be used as a light-redirecting element to produce a diffraction pattern from the objects in the image according to an embodiment. FIG. 3a illustrates a wedge 300 that includes an angle between its input surface 302 and output surface 304. Light rays 306 incident on the wedge 300 may be bent by refraction. The refractive index varies by wavelength so that light rays 306 having different wavelengths are bent by different amounts which result is a spreading of light rays according to the incident spectrum.

A diffraction grating is a collection of reflecting or transmitting elements separated by a distance comparable to the wavelength of light under study. It may be thought of as a collection of diffracting elements, such as a pattern of transparent slits or apertures in an opaque screen, or a collection of reflecting grooves on a substrate, e.g., a blank. In either case, the fundamental physical characteristic of a diffraction grating is the spatial modulation of the refractive index. Upon diffraction, an electromagnetic wave incident on a grating will have its electric field amplitude, or phase, or both, modified in a predictable manner, due to the periodic variation in refractive index in the region near the surface of the grating.

FIG. 3b illustrates a transmission diffraction element 320 according to an embodiment. In FIG. 3b, a transmission diffraction element 320 includes a periodic structure with slits/grating 322 that diffracts incident light rays 324 into several emerging light rays 326 travelling in different directions. The dispersion of the emerging light rays 326 depends on the spacing of the grating 322 and the wavelength of the incident light rays 324. For the transmission diffraction element 320, the diffracted light rays 324 lie on the opposite side 328 of the transmission diffraction element 320 from the side 330 for the incident light rays 322.

FIG. 3c illustrates a reflection diffraction element 340 according to an embodiment. In FIG. 3c, the reflection diffraction element 340 may include a grating 348 superimposed on a reflective surface. For the reflection diffraction element 340, the incident rays 342 and diffracted rays 344 lie on the same side 346 of the element 340. Optical systems can be folded with reflection diffraction element 340, which reflect as well as disperse, whereas transmission diffraction element 320 are in-line and therefore usually of greater length. Moreover, reflection diffraction element 340 may operate at much higher angles of diffraction than a transmission diffraction element 320.

Figure 4:
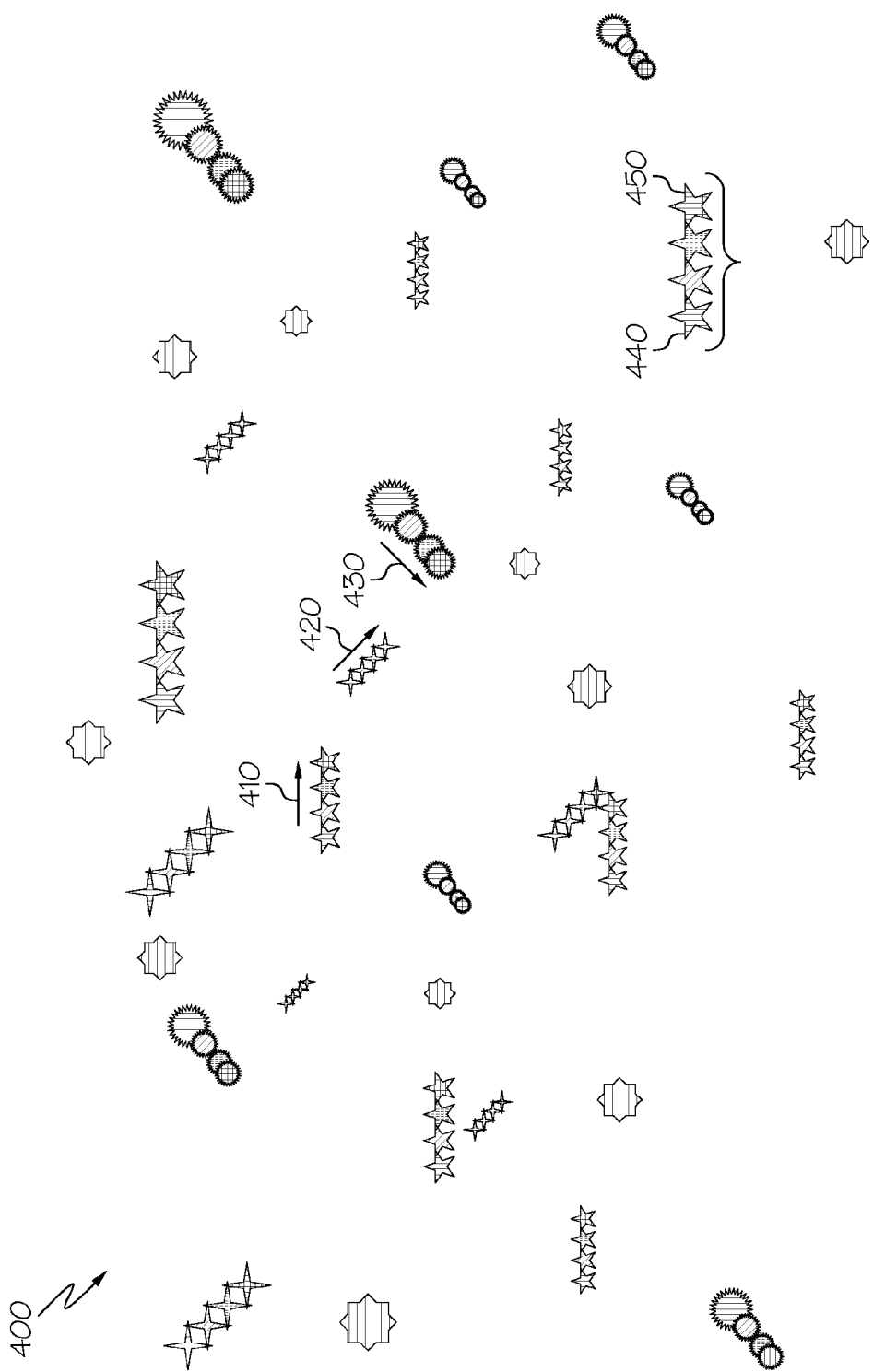
FIG. 4 illustrates an image from a refraction example according to an embodiment.

FIG. 4 illustrates an image 400 from a refraction example according to an embodiment. In FIG. 4, four different optical axes are shown overlapping on the same image 400. Thus, FIG. 4 shows three overlapping images 410, 420, 430 from three different spatial locations, e.g., see arrows showing the three different directions. Color variation may occur from one side 440 of the image to the other side 450, e.g., for all off axis images.

Figure 5:
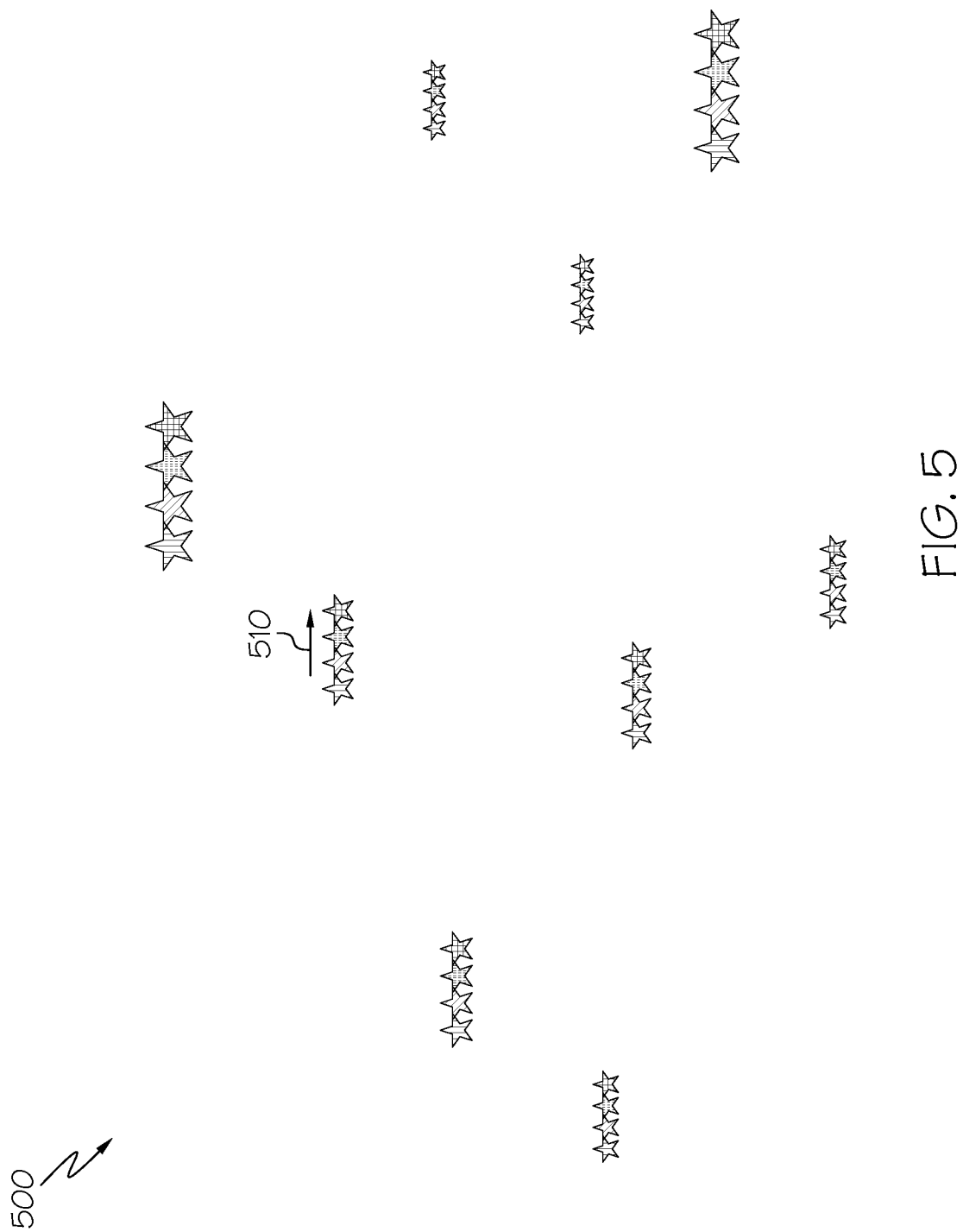
FIG. 5 illustrates the image of FIG. 4 filtered along a first axis according to an embodiment.

FIG. 5 illustrates the image of FIG. 4 filtered along a first axis 500 according to an embodiment. In FIG. 5, the image of FIG. 4 is shown filtered along a horizontal axis 510. The stars in the horizontal diffraction direction 510 are filtered out from the overlapping images 410, 420, 430 of FIG. 4. By coordinating relative locations, e.g., locations in the horizontal axis 510, star magnitude and spectral content, the location of the star in space that the portion of the star sensor is viewing may be determined.

Figure 6:
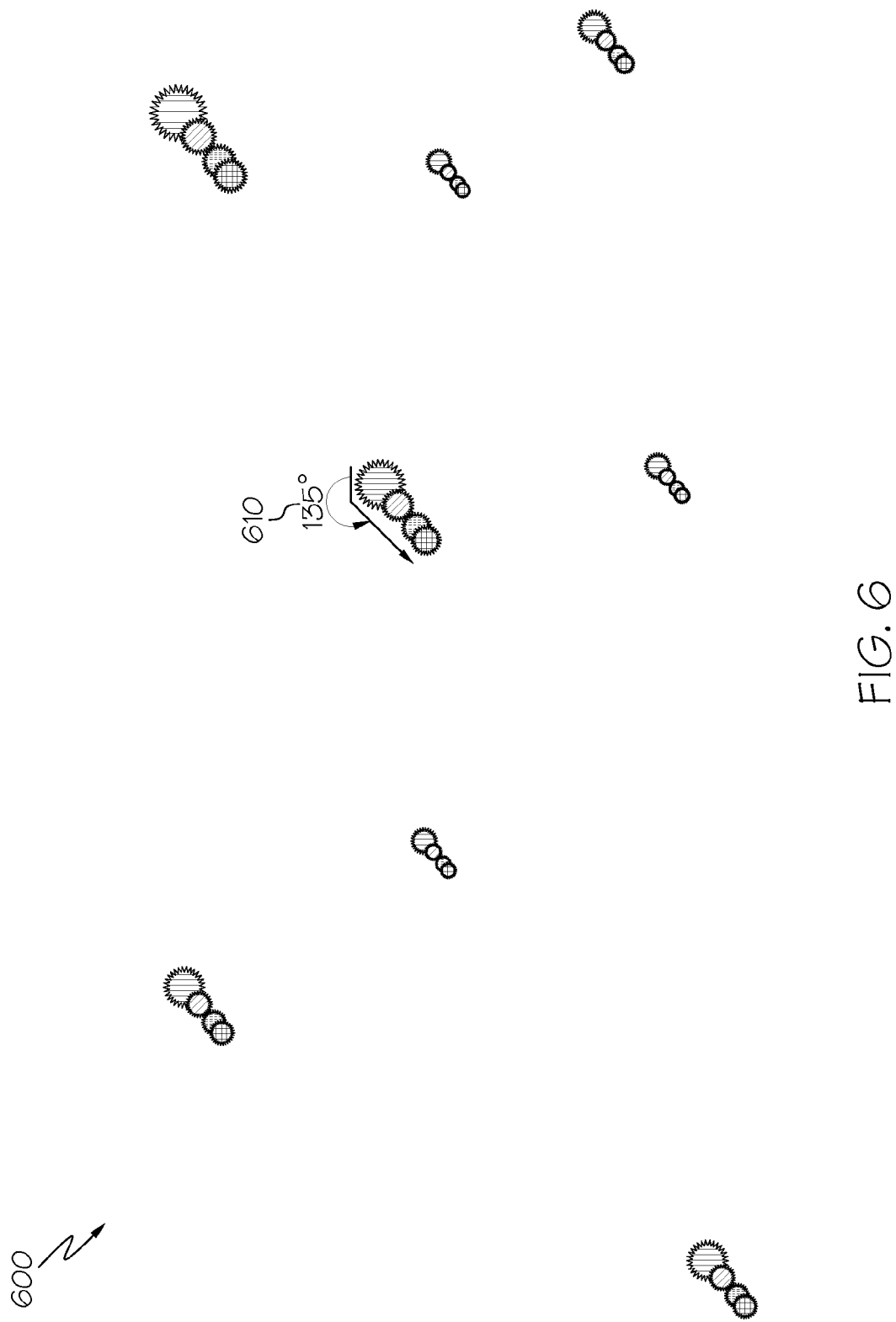
FIG. 6 illustrates the image of FIG. 4 filtered along a second axis according to an embodiment.

FIG. 6 illustrates the image of FIG. 4 filtered along a second axis 600 according to an embodiment. In FIG. 6, the image of FIG. 4 is shown filtered along, for example, a 135° axis 610. The stars in the 135° axis 610 are filter out and shown. By coordinating relative locations, e.g., locations in the 135° axis 610, star magnitude and spectral content, the location of the star in space that the portion of the star sensor is viewing may be determined.

Figure 7:
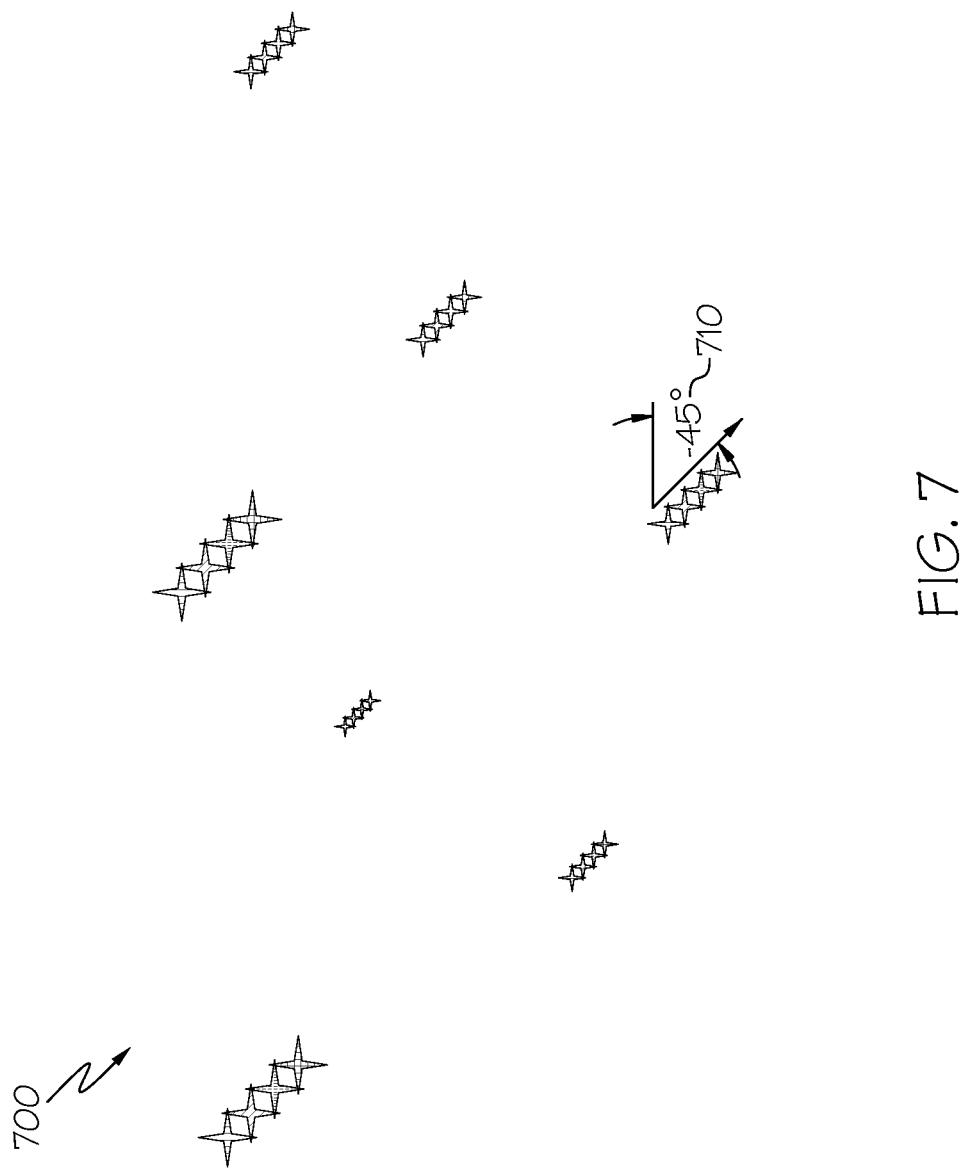
FIG. 7 illustrates the image of FIG. 4 filtered along a third axis according to an embodiment.

FIG. 7 illustrates the image of FIG. 4 filtered along a third axis 700 according to an embodiment. In FIG. 7, the image of FIG. 4 is shown filtered along, for example, a −45° axis 710. The stars in the −45° axis 710 are filter out and shown. By coordinating relative locations, e.g., locations in the −45° axis 710, star magnitude and spectral content, the location of the star in space that the portion of the star sensor is viewing may be determined.

Figure 8:
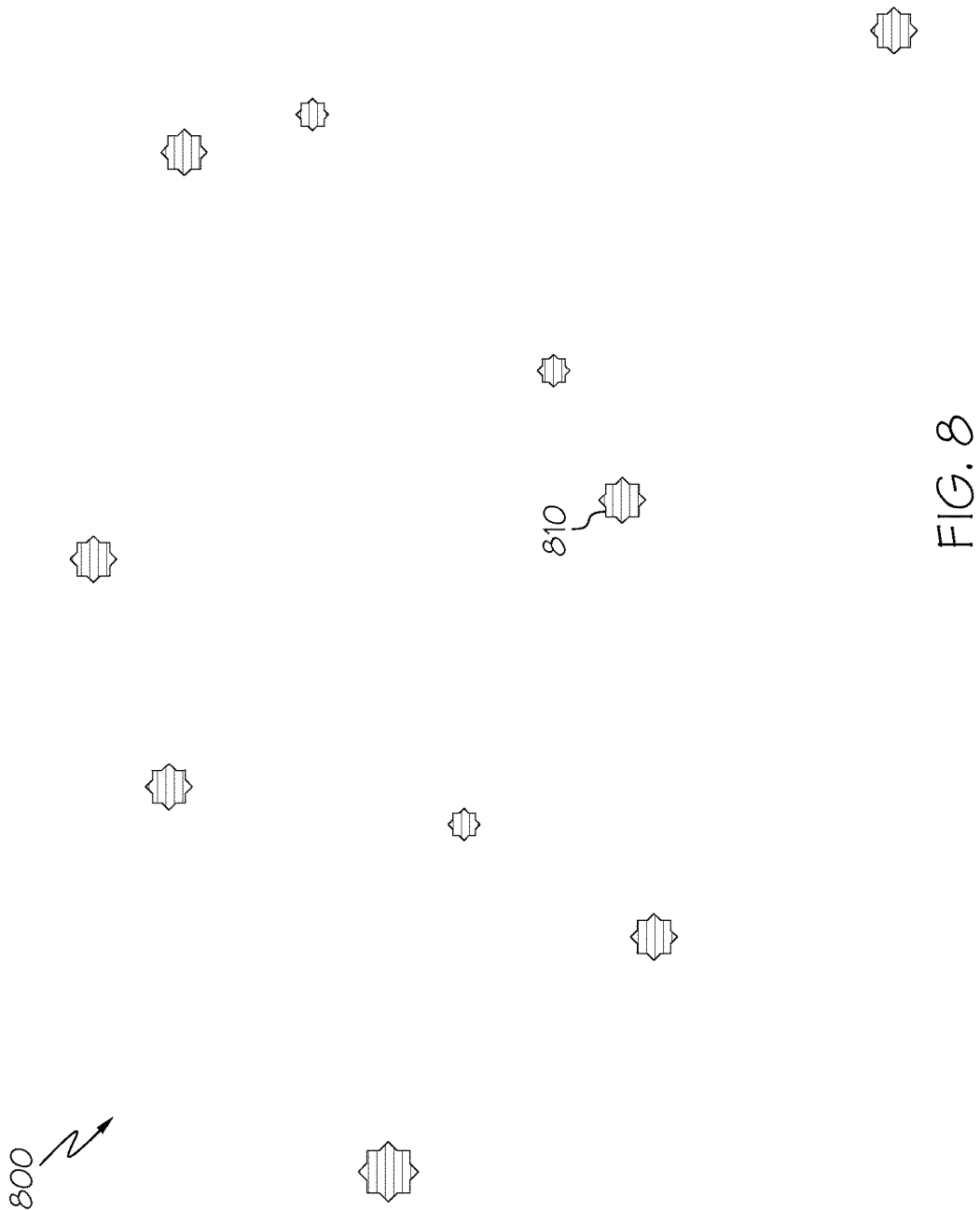
FIG. 8 illustrates stars that have no diffraction axis according to an embodiment.

FIG. 8 illustrates an image of stars that have not been diffracted 800 according to an embodiment. In FIG. 8, the stars that have no diffraction axis 810 are not distorted in any particular direction. Thus, the stars that have no diffraction axis 810 are the stars that were not refracted and are distinguishable from the other stars. These stars 810 are from the primary axis of the star tracker (see primary axis 290 shown in FIG. 2).

FIG. 9 illustrates a tracking apparatus having a wedged reflective mirror 900 according to an embodiment. In FIG. 9, the tracking apparatus having a wedged reflective mirror 900 includes a partially reflecting surface 910 and a fully reflecting coating 920. The tracking apparatus having a wedged reflective mirror 900 is introduced into the beam path of the off axis beam paths. In FIG. 9, multiple reflections occur between the first surface 910 and second surface 920, and multiple images 940 of the same star are produced in the plane of the wedge 930. These images have the same spectral content, but will appear as multiple ghost images 940 along the axis of the wedge 930. The angle of these ghosts images 940 determines which beam path an individual star is from. A lens 950 may be used to focus the emerging light rays 952 to produce the ghost images 940.

Figure 10:
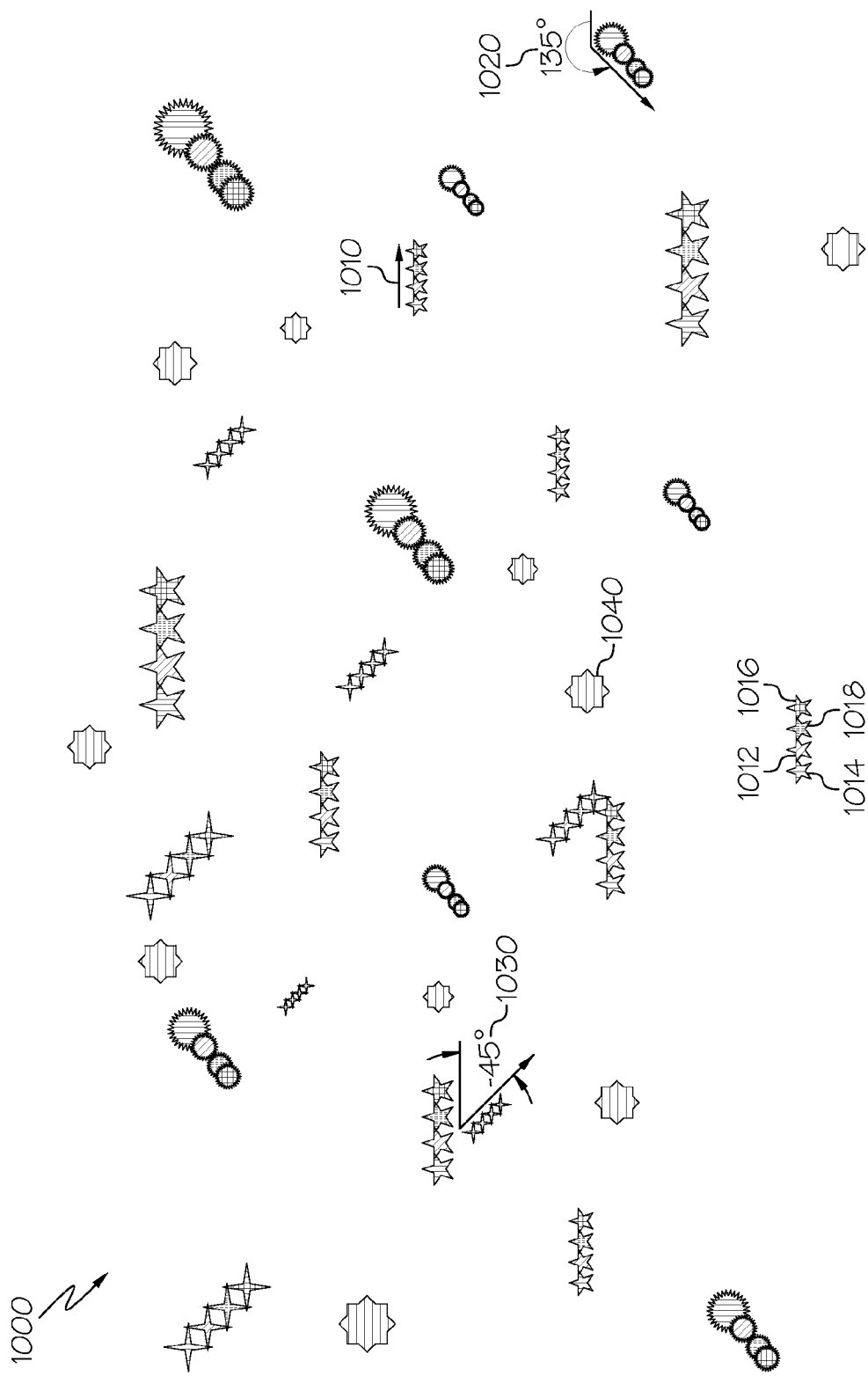
FIG. 10 illustrates an image produced by the wedged mirror of FIG. 9 according to an embodiment.

FIG. 10 illustrates an image 1000 produced by the wedged mirror of FIG. 9 according to an embodiment. In FIG. 10, as with FIG. 5, four different optical axes are shown overlapping on the same image 1000: horizontal diffraction axis 1010; 135° diffraction axis 1020; −45° diffraction axis 1030; and no diffraction axis 1040. Multiple images 1012, 1014, 1016, 1018 of the same star due to multiple reflections on the surfaces of the mirror are produced in line with the wedge angle of the mirror. However, the image from wedged mirror 900 of FIG. 9 produces no spectral variation for the multiple images 1012, 1014, 1016, 1018 of the stars.

Thus, as disclosed above, a lens may be used to focus light to a single imaging sensor. Multiple sub-aperture segments are used to view many different relative angles simultaneously. Viewing multiple directions at one time allows a higher probability of seeing a bright star in the fields of view. Identifying multiple known stars in different view angles also allows the processor to determine three orientation angles at one time. Still further, the optical system uses several overlapping images on the same camera to decrease the volume and surface area and to view a large number of angles for tracking. The view angle is directly related to the image pattern at the sensor array and is determined by the image processor. Parameters may also be used (simultaneously) to determine the identity of the stars being imaged.

Figure 11:
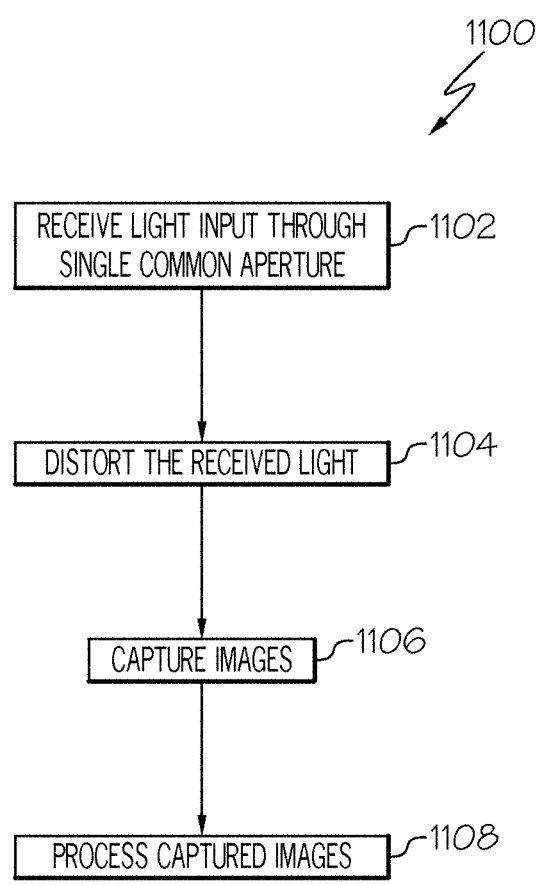
FIG. 11 is a flow diagram depicting one embodiment of the disclosed method for tracking a light source.

Also disclosed is a method for tracking a light source. Referring to FIG. 11, in one embodiment, the disclosed method for tracking a light source, generally designated 1100, may be begin at Block 1102 with the step of receiving input through a single common aperture of light rays from a plurality of objects in multiple directions. At Block 1104, the light received from the plurality of objects may be distorted, via a single light-redirecting element, to output light from a particular object having an image distorted at a particular angle that is indicative of the direction of the light from a particular source. At Block 1106, images for the plurality of objects may be captured, via a single imaging sensor, in multiple directions from the output from the light-redirecting element. The image from a particular object may be distorted at a particular angle depending on an orientation at which the light originated. At Block 1108, the images captured by the single imaging sensor may be processed, via an image processor, to separate an image for the particular object based on image distortion at the particular angle associated with the particular object, and to generate an output of a specific light image associated with the particular object.

Although various embodiments of the disclosed light source tracking apparatus, multi-spectral star tracker system and method have been shown and described, modifications may occur to those skilled in the art upon reading the specification. The present application includes such modifications and is limited only by the scope of the claims.

What is claimed is:

1. A light source tracking apparatus comprising:
  a common aperture arranged to receive first light rays originated from a first plurality of objects from a first direction and second light rays originated from a second plurality of objects from a second direction;
  a first light-redirecting element arranged to angularly distort the first light rays at a first angle that is indicative of the first direction from which the first light rays originated;
  a lens arranged to transmit the distorted first light rays and the second light rays to form images of the first plurality of objects and images of the second plurality of objects;
  an imaging sensor arranged to capture the images of the first plurality of objects overlapped with the images of the second plurality of objects; and
  an image processor arranged to receive the captured images from the imaging sensor and to separate a particular image of a particular object of the first plurality of objects as discriminated by the angular distortion of the particular image and to generate an output of the particular image of the particular object.

2. The light source tracking apparatus of claim 1 wherein the first light-redirecting element comprises a diffracting element, the diffracting element including a periodic structure that separates the first light rays.

3. The light source tracking apparatus of claim 1 wherein the first light-redirecting element comprises a refracting element, the refracting element including a transmission medium that bends the first light rays.

4. The light source tracking apparatus of claim 1 wherein the first light-redirecting element comprises a surface mirror with a wedge for spreading the first light rays.

5. The light source tracking apparatus of claim 1 further comprising a second light-redirecting element arranged to angularly distort the second light rays at a second angle that is indicative of the second direction from which the second light rays originated, the second direction being different than the first direction.

6. The light source tracking apparatus of claim 1 wherein the common aperture is arranged to receive third light rays originated from a third plurality of objects from a third direction, wherein the lens is arranged to receive the third light rays in an angularly undistorted state and transmit the third light rays to form images of the third plurality of objects.

7. A method for tracking a light source, comprising the steps of:
    receiving first light rays originated from a first plurality of objects from a first direction and second light rays originated from a second plurality of objects from a second direction;
    transmitting the first light rays and the second light rays to form images of the first plurality of objects and images of the second plurality of objects, wherein transmitting the first light rays includes angularly distorting the images of the first plurality of objects at a first angle that is indicative of the first direction from which the first light rays originated;
    capturing, in a single combined image, the images of the first plurality of objects overlapped with the images of the second plurality of objects; and
    processing the single combined image to separate a particular image of a particular object of the first plurality of objects as discriminated by the angular distortion of the particular image and to generate an output of the particular image of the particular object.

8. The method for tracking a light source of claim 7 wherein the step of angularly distorting the images of the first plurality of objects includes diffracting the first light rays using a diffracting element, the diffracting element including a periodic structure that separates first light rays.

9. The method for tracking a light source of claim 7 wherein the step of angularly distorting the images of the first plurality of objects includes refracting the first light rays using a refracting element, the refracting element including a transmission medium that bends the first light rays.

10. The method for tracking a light source of claim 7 wherein the step of angularly distorting the images of the first plurality of objects includes creating multiple reflections of the first light rays using a surface mirror with a wedge.

11. The method for tracking a light source of claim 7 further comprising angularly distorting the images of the second plurality of objects at a second angle that is indicative of the second direction from which the second light rays originated, the second direction being different than the first direction.

12. The method for tracking a light source of claim 7 further comprising:
    receiving third light rays originated from a third plurality of objects from a third direction; and
    transmitting the third light rays to form images of the third plurality of objects, wherein a lens is arranged to receive the third light rays in an undistorted state and transmit the third light rays to form the images of the third plurality of objects.

13. A multi-spectral star tracker system comprising:
    a camera, comprising:
        a common aperture arranged to receive first light rays originated from a first plurality of objects from a first direction and second light rays originated from a second plurality of objects from a second direction;
        a first light-redirecting element arranged to angularly distort the first light rays at a first angle that is indicative of the first direction from which the first light rays originated;
        a lens arranged to transmit the distorted first light rays and the second light rays to form images of the first plurality of objects and images of the second plurality of objects; and
        an imaging sensor arranged to capture the images of the first plurality of objects overlapped with the images of the second plurality of objects; and
    a processor arranged to receive the captured images from the imaging sensor and to separate a particular image of a particular object of the first plurality of objects as discriminated by the angular distortion of the particular image and to provide space navigation information based on the separated image of the particular object.

14. The multi-spectral star tracker system of claim 13 wherein the first light-redirecting element comprises a diffracting element, the diffracting element including a periodic structure that separates the first light rays.

15. The multi-spectral star tracker system of claim 13 wherein the first light-redirecting element comprises a refracting element, the refracting element including a transmission medium that bends the first light rays.

16. The multi-spectral star tracker system of claim 13 wherein the first light-redirecting element comprises a surface mirror with a wedge for spreading the first light rays.

17. The multi-spectral star tracker system of claim 13 wherein the camera further comprises a second light-redirecting element arranged to angularly distort the second light rays at a second angle that is indicative of the second direction from which the second light rays originated, the second direction being different than the first direction.

18. The multi-spectral star tracker system of claim 13 wherein the common aperture is arranged to receive third light rays originated from a third plurality of objects from a third direction, wherein the lens is arranged to receive the third light rays in an angularly undistorted state and transmit the third light rays to form images of the third plurality of objects.

19. The multi-spectral star tracker system of claim 13 wherein the processor is configured to process the angular distortion of the particular image to produce a spectral distribution of the particular object.

20. The multi-spectral star tracker system of claim 13 wherein the processor is configured to process the angular distortion of the particular image to produce a theoretical centroid of the particular object.

* * * * *